United States Patent [19]

Lederman

[11] Patent Number: 5,070,977
[45] Date of Patent: Dec. 10, 1991

[54] LEG TYPE ROLLER CLUTCH ASSEMBLY

[75] Inventor: Frederick E. Lederman, Sandusky, Ohio

[73] Assignee: General Motors Corporation, Detroit, Mich.

[21] Appl. No.: 651,877

[22] Filed: Feb. 7, 1991

[51] Int. Cl.⁵ ............................................. F16D 41/06
[52] U.S. Cl. ................................... 192/45; 192/41 R
[58] Field of Search ..................... 192/45, 41 R, 41 S

[56] References Cited

U.S. PATENT DOCUMENTS

| | | | |
|---|---|---|---|
| 2,096,438 | 10/1937 | Rockwell | 192/45 |
| 2,755,899 | 7/1956 | Erickson | 192/45 |
| 2,804,956 | 9/1957 | Kneidler | 192/45 |
| 2,902,125 | 9/1959 | House et al. | 192/45 |
| 3,054,489 | 9/1962 | Fahlberg | 192/45 |
| 3,087,589 | 4/1963 | Gorsky | 192/45 |
| 3,087,590 | 11/1960 | Gorsky | 192/45 |
| 3,087,591 | 4/1963 | Whitney et al. | 192/45 |
| 3,247,727 | 4/1966 | Digby et al. | 192/45 |
| 3,279,571 | 10/1966 | Wassilieff | 192/45 |
| 3,590,667 | 7/1971 | Berglein | 192/45 X |
| 4,003,457 | 1/1977 | Dahlstrom | 192/45 |

FOREIGN PATENT DOCUMENTS

| | | | |
|---|---|---|---|
| 2136650 | 2/1973 | Fed. Rep. of Germany | 192/45 |
| 113327 | 6/1984 | Japan | 192/45 |

*Primary Examiner*—Allan D. Herrmann
*Assistant Examiner*—Andrea Pitts
*Attorney, Agent, or Firm*—Patrick M. Griffin

[57] ABSTRACT

A leg type roller clutch has a cooperating cage and side plate that retain all components together as a unit. The cage includes partially cylindrical bearing flanges that insulate the pathway from directly rubbing on the load bearing legs of the cam race.

3 Claims, 3 Drawing Sheets

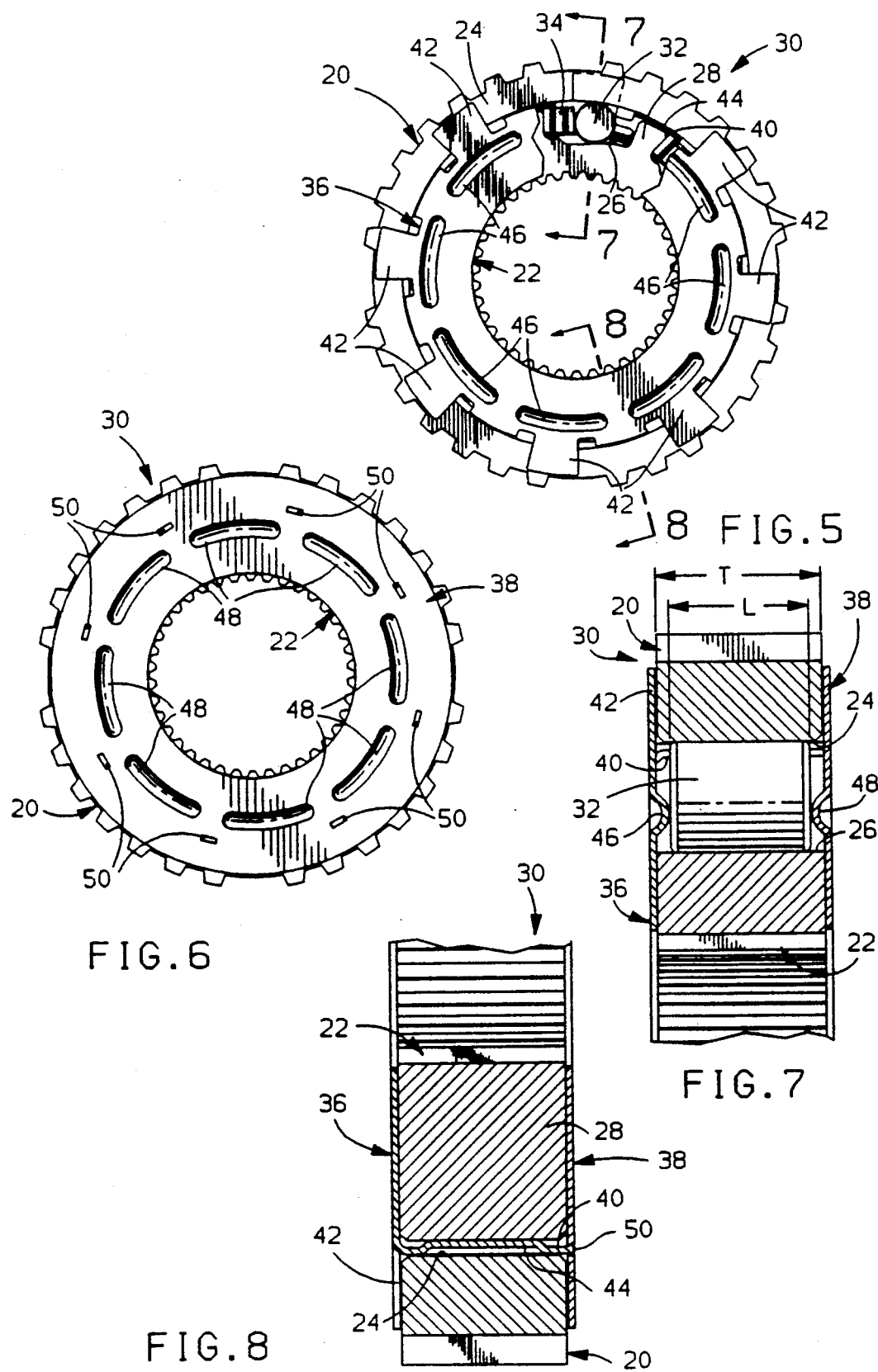

LEG TYPE ROLLER CLUTCH ASSEMBLY

This invention relates to overrunning roller clutches in general, and specifically to a leg type roller clutch assembly with improved concentricity control.

BACKGROUND OF THE INVENTION

An older type of overrunning roller clutch, often referred to as a leg type roller clutch, still finds application in areas where heavy loads are experienced. In more recent designs, close fitting journal blocks incorporated in the clutch cage serve to keep the races coaxial, sometimes known as concentricity control, and also take radial loads between the races. In a leg clutch, however, the cam race itself provides the load transfer and bearing functions. The cam race includes an evenly spaced plurality of so called legs, solid members which extend radially toward the cylindrical pathway of the pathway race. The ends of the legs are ground to match the pathway, thereby creating bearing surfaces to support the pathway race as it overruns relative to the cam race. In order to provide sufficient accuracy to keep the races substantially coaxial, the cam race must generally be carefully machined and ground. The cam races used with journal block type cages, on the other hand, can generally achieve sufficient accuracy from less expensive, powdered metal forming techniques. In addition, some applications require that the machined ends of the legs be plated with a friction reducing cladding material, in order to prevent marring of the pathway that could otherwise result from running bare steel on steel.

SUMMARY OF THE INVENTION

The invention provides a leg type roller clutch in which the cam race need not be carefully machined, and in which the pathway is well protected without plating the ends of the legs.

A preferred embodiment of the clutch assembly of the invention incorporates a pathway race of conventional design, and a cam race. Like a conventional leg type cam race, the cam race disclosed has a plurality of solid legs the ends of which rest close to the pathway when the races are coaxially disposed. Unlike conventional leg type races, however, a deliberate radial gap is created between the ends of the legs and the pathway. Consequently, the pathway cannot, and is not intended to, pilot directly on the ends of the legs. Instead, the races are maintained coaxial to one another by a specially designed cage. The cage is a sheet metal stamping that includes a plurality of partially cylindrical, axially extending bearing flanges that are located radially between the ends of the cam race legs and the pathway, filling the radial gaps and conforming closely to the pathway. Consequently, there is no need to accurately machine the ends of the legs, which can be formed instead by inexpensive powdered metal methods.

In addition, in the embodiment disclosed, each bearing flange is stamped with a shallow channel that lends it some resilience, helping to absorb and cushion any potential shock loads between the races. The cage and side plate also are stamped with cooperating pairs of opposed indentations that fit closely between the legs, serving to properly locate the parts as well as providing thrust surfaces for the ends of the rollers. The ends of the bearing flanges are also riveted to a side plate, which prevents the races the axially separating and retains a complement of rollers and energizing springs between the races.

It is, therefore, a general object of the invention to provide a leg type roller clutch in which the ends of the legs do not have to be carefully machined or plated in order to provide bearing surfaces.

It is another object of the invention to provide such a roller clutch in which the bearing function is provided by shaped flanges on a stamped metal cage interposed between the ends of the cam race legs and the pathway.

It is another object of the invention to provide a roller clutch assembly in which the metal cage is also secured to a side plate that retains the races, springs and rollers together as a modular unit.

It is still another object of the invention to provide such a roller clutch assembly in which the bearing flanges are also stamped with resilient channels to help absorb and cushion loads.

It is yet another object of the invention to provide such a module in which the cage and side plate are stamped with indentations that cooperate to serve both as locators and as roller end wear surfaces.

DESCRIPTION OF THE PREFERRED EMBODIMENT

These and other objects and features of the invention will appear from the following written description, and from the drawings, in which:

FIG. 5 is an axial view of the completed assembly with part of the cage broken away;

FIG. 6 is a view similar to FIG. 5, but looking in the other axial direction;

FIG. 7 is a sectional view taken along the line 7—7 FIG. 5;

FIG. 8 is a sectional view taken along the line 8—8 of FIG. 5;

Figure 1:
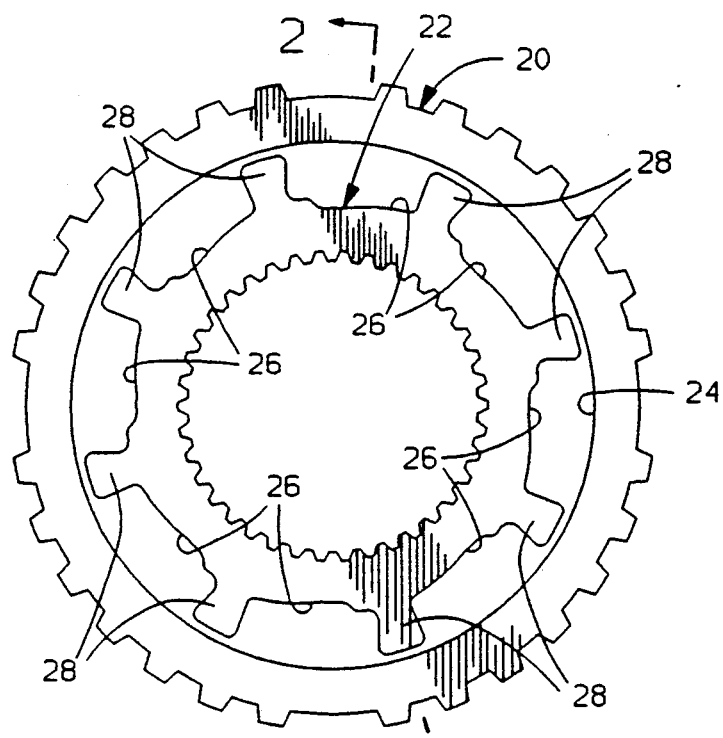
FIG. 1 is an axial view of the clutch races alone, coaxially disposed.
Figure 2:
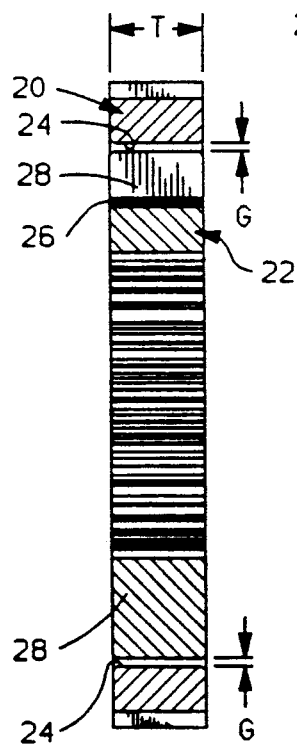
FIG. 2 is a sectional view taken along the line 2—2 of FIG. 1.
Figure 3:
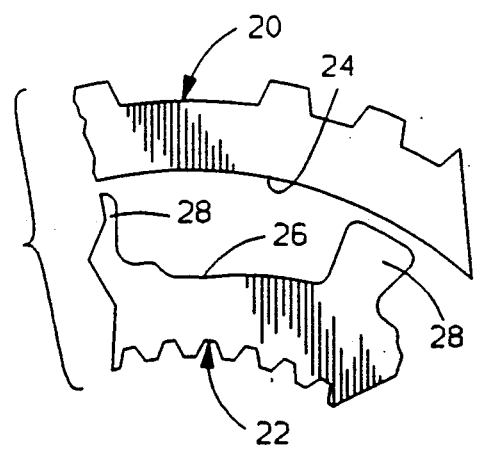
FIG. 3 is an enlarged portion of FIG. 1.
Figure 4:
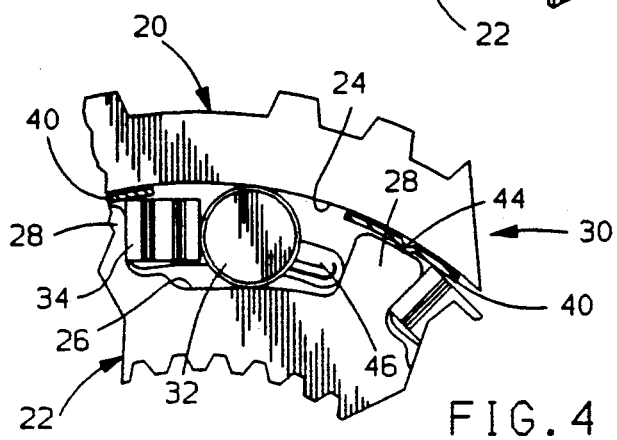
FIG. 4 is a view similar to FIG. 3, but showing the cage, rollers and springs in place with the side plate removed.

Referring first to FIGS. 1 and 3, a pair of clutch races are illustrated, including an outer pathway race, indicated generally at 20, and an inner cam race, indicated generally at 22, each of which has an axial thickness T, measured side to side. The races 20 and 22 are illustrated in a coaxial relation for purposes of illustration, although it will be understood that they are not so oriented until such time as other structure, described below, is installed. Pathway race 20 is conventional, with a smooth cylindrical pathway 24. Cam race 22 has a conventional basic shape, including a plurality of eight evenly spaced cam ramps 26 separated by eight evenly spaced, radially extending solid legs 28. The legs 28 have generally arcuate ends, which lie on a common cylindrical surface. However, the legs 28 terminate deliberately short of pathway 24, with a predetermined radial gap G between them, at least when the races 20 and 22 are disposed coaxially. Since the ends of the legs 28 do not have to be machined closely to match the pathway 24, cam race 22 can be formed by powdered metal techniques.

Figure 9:
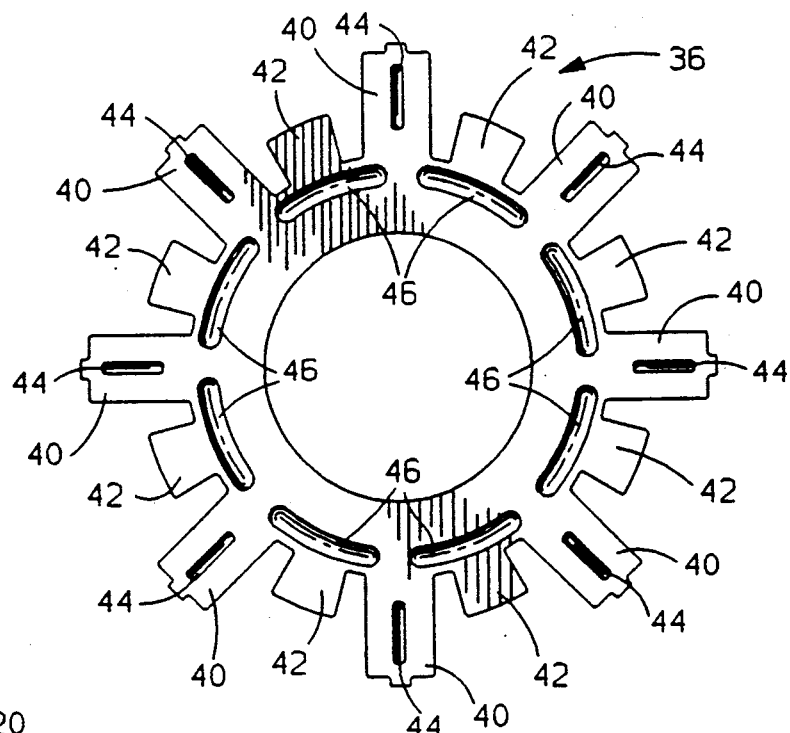
FIG. 9 shows the blank from which the cage is folded.

Referring next to FIGS. 5, 6, 7 and 9, a preferred embodiment of the roller clutch assembly of the invention, indicated generally at 30, includes the races 20 and 22, as well as a complement of pairs of cylindrical rollers 32 and associated energizing springs 34. Each roller 32 has an end to end length L that is less than T. These are retained all together as a module by a cage, indicated generally at 36, and a cooperating side plate, indicated generally at 38. Cage 36, as best seen in FIG. 9, is stamped from a generally annular blank of bronze clad sheet steel, with the bronze cladding on the surface visible in FIG. 9. Radiating outwardly from the blank are an evenly spaced series of eight rectangular bearing flanges 40, each of which is somewhat longer than T and wider than the end of a cam race leg 28. The bearing flanges 40 alternate with eight evenly spaced, generally square retention tabs 42. The retention tabs 42 are shorter than the bearing flanges 40, disposed at a radius that is approximately the same as pathway race 24. Stamped centrally down the length of each bearing flange 40 is a shallow groove or channel 44, which is approximately as deep as the gap G defined above. Therefore, the effective thickness of bearing flange 40 is close to G, although the metal is not that thick. Stamped into the body of cage 36, radially inboard of each retention tab 42, is a circumferentially extending indentation 46, which is approximately as long as the circumferential spacing of the cam race legs 28. Each indentation 46 has a depth equal to approximately half of T minus L. Side plate 38 is much simpler in construction than cage 36. Side plate 38 is basically an annular ring stamped from a blank of the same bronze clad sheet steel, with eight indentations 48 identical to those in cage 36.

Figure 10:
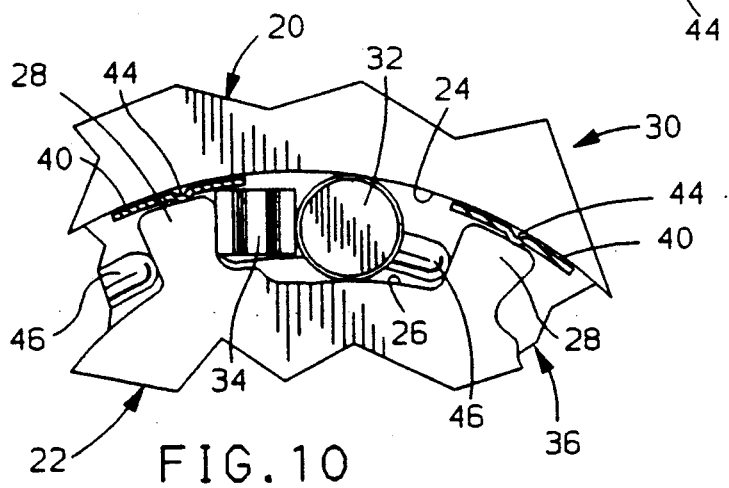
FIG. 10 is a view similar to FIG. 4, showing normal loading between the races.

Referring next to FIGS. 5, 9 and 10, clutch assembly 30 is assembled from the components described above by first forming cage 36 around cam race 22. This is done by abutting the blank with one side of the cam race 22 and fitting the indentations 46 between the cam race legs 28 so as to properly register the bearing flanges 40 with the legs 28. Next, the bearing flanges 40 are folded down 90 degrees over the ends of the cam race legs 28, so as to extend axially outwardly from cage 36, and then sized by a process known as ironing. In the ironing process, the bearing flanges 40 are forced inside a cylindrical form that squeezes the metal down to leave the bearing flanges 40 partially cylindrical in shape, with outer surfaces that all lie on a cylindrical surface very close to the pathway 24. In that final sizing operation, the channels 44 can deform and flatten to an extent to provide tolerance take up, compensating for tolerance variations in the radial gap G. At that point, the cam race 22, with the cage 36 formed to it, provides a fixture or jig for the installation of the pairs of rollers 32 and springs 34. The base of each spring 34 is retained by the three sided nest or enclosures formed by the side of a cam race leg 28, the overhanging bearing flange 40, and the cam ramp 26, best shown in FIG. 10. The spring 34, in turn, when fully expanded, can press a roller 32 into the same three sided enclosure formed by the adjacent leg 28. While not specifically illustrated, this temporary retention of the rollers 32 by the expanded springs 34 is sufficiently secure to allow the pathway race 20 to be installed the conventional so called ringing-in technique, which shifts each roller 32 down its cam ramp 26 and compresses each spring 34 to the FIG. 10 position.

Referring next to FIGS. 6, 7 and 8, side plate 38 is added after pathway race 24 has been installed. Side plate 38 is abutted with the other side of the races 22 and 24, and turned until its indentations 48 fit between the legs 28. Then, it is riveted to the end of each bearing flange 40 at 50, best seen in FIG. 8. All components are thereby very securely retained together as a module. The races 20 and 22 are prevented from separating axially by the riveted cage 36 and side plate 38. The pairs of rollers 32 and springs 34 are completely retained by the cage 36 and side plate 38. The ends of the rollers 32 are closely confined between the opposed pairs of indentations 46 and 48, by virtue of the relation of their depth to the differential between T and L. Thus, clutch assembly 30 can be vigorously handled during shipping and installation with no danger of part loss.

Figure 11:
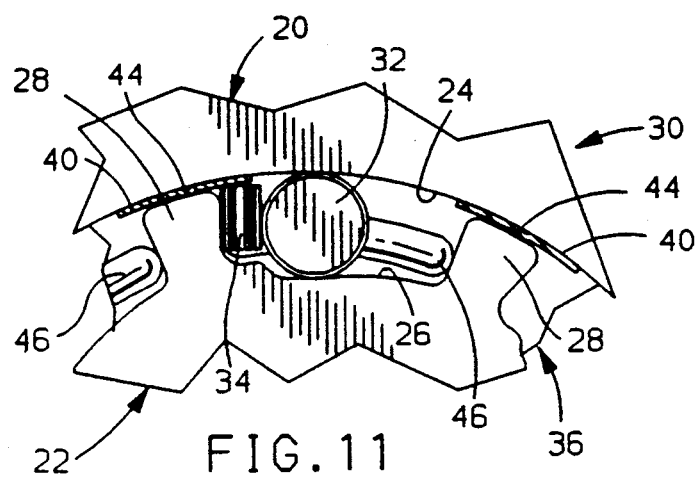
FIG. 11 is a view similar to FIG. 10, but showing high loading between the races.

Referring next to FIGS. 7, 8, 10 and 11, it may be seen how the same structures that provide a secure unit for shipping and handling also cooperate to a high degree to give numerous operational advantages. Clutch assembly 30 would likely be used as a shift timer in an automatic transmission, where the outer race 20 would be subject to high speeds at overrun, and to high radial loads. The races 20 and 22 are maintained closely coaxial by the bearing flanges 40, which are located radially between the ends of the cam race legs 28 and pathway 24, closely filling the gaps G. A much larger bearing surface area is presented to the pathway 24 by the over sized outer surfaces of the bearing flanges 40 than the ends of the legs 28 alone could provide. The outer surfaces of the bearing flanges 40 are bronze clad, as well, so as to reduce rubbing friction when pathway 24 slides rapidly over them during overrun. Further reducing friction on pathway 24 are the shallow channels 44, the concave portions of which face the pathway 24. The entire assembly 30 would be continually exposed to a supply of lubricant that will migrate wherever it is given a suitable path. Lubricant could reach the interior of the races 20 and 22, for example, because there are openings between the bearing flanges 40 and retention tabs 42. The channels 44 can act to retain lubricant at the interface. Pathway 24 is also protected from the springs 34 by the overhanging flanges 40. The legs 28 are protected against high radial shock loads from the pathway 24 by the resilience of the bearing flanges 40 that is created by the presence of the channels 44. As shown in FIG. 11, the bearing flanges 40 can compress to an extent under high load, cushioning the shock. They would then rebound to the FIG. 10 condition. Rubbing friction of the roller ends 32 is reduced by the convex surfaces of the opposed indentations 46 and 48, as best seen in FIG. 7. The sides of the races 20 and 22 could be subjected to bumping and rubbing thrust loads from adjacent structure, not shown. The sides of the races 20 and 22 are protected by the cage 36 and side plate 38. Any rubbing friction on the outer surfaces of the side plate 38 and cage 36 from adjacent structures would be reduced both by the bronze cladding, and by lubricant retained in the concave portions of the indentations 46 and 48.

Variations in the preferred embodiment could be made. Cage 36 could be produced differently. For example, the bearing flanges 40 could be bent to shape before being assembled to the cam race 22. Ironing the flanges 40 in place over the ends of cam race legs 28 assures that the flanges 40 will fit properly, however. The basic advantage of a leg type clutch in which the ends of the legs 28 are insulated from direct rubbing on the pathway 24 could be achieved by a cage in which the bearing flanges 40 did not have the channels 44, nor would the ends of the bearing flanges 40 have to be secured to a side plate 38. Without the channels 44 to increase the effective thickness of the bearing flanges 40 so as to closely fill the gaps G, however, they would have to be stamped from thicker sheet metal, or some other means, like flanking side bearings would have to be provided to keep the races 22 and 24 in close coaxial relation. As few as one indentation like 46 on cage 36 could serve just to properly circumferentially locate the bearing flanges 40 over the ends of the cam race legs 28, but a plurality can be provided as cheaply, thereby providing the rubbing surfaces for the ends of all the rollers 32, as well. Bearing flanges that were not wider than the ends of the cam race legs 28 would still provide the same basic prevention of direct rubbing, but without presenting as much bearing surface area, and without providing the spring retention feature. The extra width of the bearing flanges 40 really requires no more metal in the blank, and the indentations 46 and 48 and channels 44 are easily stamped. The indentations 46 and 48 are especially useful, providing as they do part location during assembly, roller friction reduction and lubricant retention, all at essentially no extra cost. So, too, with the channels 44, which provide tolerance take up during assembly, lubricant retention and load cushioning. Therefore, it will be understood that it is not intended to limit the invention to just the embodiment disclosed.

The embodiments of the invention in which an exclusive property or privilege is claimed are defined as follows:

1. An overrunning roller clutch assembly, comprising,
   a pathway race having a cylindrical pathway,
   a cam race coaxially disposed relative to said pathway race, said cam race having a plurality of evenly circumferentially spaced legs extending radially toward said pathway and terminating short of said pathway,
   a roller and energizing spring pair located between each pair of adjacent cam race legs, and,
   a cage having a plurality of partially cylindrical, axially extending bearing flanges located radially between said cam race legs and pathway and conforming closely to said pathway,
   whereby said pathway is prevented from rubbing directly on said cam race legs by said cage bearing flanges.

2. An overrunning roller clutch assembly, comprising,
   a pathway race having a cylindrical pathway,
   a cam race coaxially disposed relative to said pathway race, said cam race having a plurality of evenly circumferentially spaced legs extending radially toward said pathway and terminating short of said pathway,
   a roller and energizing spring pair located between each pair of adjacent cam race legs, and,
   a cage having a plurality of partially cylindrical, equally circumferentially spaced, axially extending bearing flanges conforming closely to said pathway, said cage also having at least one circumferentially extending indentation with a length substantially equal to the spacing of said cam race legs so as to fit closely between an adjacent pair of said cam race legs,
   whereby said bearing flanges are located over the ends of said cam race legs and radially between said cam race legs and pathway by the close fit of said indentation between said cam race legs to prevent said pathway from rubbing directly on said cam race legs.

3. An overrunning roller clutch assembly of the type that is continually exposed to a supply of lubricant, comprising,
   a pathway race having a cylindrical pathway,
   a cam race coaxially disposed relative to said pathway race, said cam race having a plurality of evenly circumferentially spaced legs extending radially toward said pathway and terminating short of said pathway with a predetermined radial gap therebetween,
   a roller and energizing spring pair located between each pair of adjacent cam race legs, and,
   a cage having a plurality of partially cylindrical, axially extending bearing flanges located in said gaps and conforming closely to said pathway, each of said bearing flanges further having a channel stamped therein with a depth substantially equal to said radial gap, the convex portion of which faces said pathway so as to retain lubricant,
   whereby said races are maintained in substantially coaxial relation by said bearing flanges closely filling said radial gaps, and said pathway is prevented from rubbing directly on said cam race legs by said cage bearing flanges.

* * * * *